United States Patent [19]

Gotoh et al.

[11] Patent Number: 5,107,949
[45] Date of Patent: Apr. 28, 1992

[54] MOTORCYCLE

[75] Inventors: Teishiroh Gotoh; Ikuo Hara; Makoto Kitagawa; Hiroyuki Takeuchi; Tomoyuki Adachi, all of Saitama, Japan

[73] Assignee: Honda Giken Kogyo Kabushiki Kaisha, Tokyo, Japan

[21] Appl. No.: 391,295

[22] Filed: Aug. 8, 1989

[30] Foreign Application Priority Data

Sep. 14, 1988 [JP] Japan ................................ 63-228400
Jun. 13, 1989 [JP] Japan ...................................... 1-6752

[51] Int. Cl.⁵ .......................... B60R 19/02; B62J 9/00
[52] U.S. Cl. .................................... 180/219; 220/1 V; 220/8; 224/32 A; 293/121
[58] Field of Search .................... 224/32 A; 180/219; 280/202, 288.3, 288.2, 288.4, 304.3, 783, 769, 770; 296/37.1, 37.16, 66, 78.1, 26, 37.15, 188; 293/105, 142, 121, 128; 220/1 V, 4 A, 8

[56] References Cited

U.S. PATENT DOCUMENTS

| 2,109,315 | 2/1938 | Harley | 224/32 A |
|---|---|---|---|
| 3,937,508 | 2/1976 | Glance et al. | 293/121 |
| 4,413,700 | 11/1983 | Shiratsuchi | 180/219 |
| 4,690,237 | 9/1987 | Funabashi et al. | 180/219 |
| 4,762,197 | 8/1988 | Yamada et al. | 180/219 |
| 4,817,749 | 4/1989 | Montano | 280/202 X |

FOREIGN PATENT DOCUMENTS

| 456183 | 2/1928 | Fed. Rep. of Germany | 224/32 A |
|---|---|---|---|
| 5221776 | 6/1977 | Japan . | |
| 0156845 | 9/1984 | Japan | 293/121 |

*Primary Examiner*—Mitchell J. Hill
*Attorney, Agent, or Firm*—Lyon & Lyon

[57] ABSTRACT

A motorcycle of the type having a luggage box in the form of oppositely spaced side cases is organized to reduce the size and weight of the component parts of the vehicle by, according to one aspect of the invention, locating the pivot shaft for the luggage box cover, which attaches the vehicle rear seat, at the front end of the luggage box to reduce the stiffness of the frame parts required to support the cover. Also, the side walls of the side cases are adjustably secured to the vehicle and so configured as to permit selective enlargement of the cases without an attendant increase in aerodynamic drag. The vehicle, further, employs particularly formed side bumpers that are arranged to prevent damage to the laterally extensive side cases of the luggage box in the event of contact between the vehicle and the road surface that would otherwise damage the cowling. Furthermore, the luggage box components are desirably designed to be mounted on a frame structure separate from the vehicle frame but detachably secured thereto in order to facilitate construction and assembly of the vehicle.

26 Claims, 8 Drawing Sheets

MOTORCYCLE

BACKGROUND OF THE INVENTION

The present invention relates to a motorcycle having a luggage box positioned at the rear portion of the vehicle body thereof.

Such a motorcycle having a luggage box at a rear portion of a vehicle body thereof is known from Japanese Patent Publication No. 52-21776, for example, and is shown in FIG. 1 herein. Referring to FIG. 1, reference numeral 01 designates a luggage box divided into an upper half section 01a and a lower half section 01b. The luggage box 01 is formed in a U-shape, as viewed in horizontal cross section, and a rear portion of the luggage box 01 extends rearwardly from a rear wheel 02. The upper half section 01a is vertically openably and pivotably supported at a rear end of the lower half section 01b.

In the prior art motorcycle shown in FIG. 1, the rear portion of the luggage box 01 extends rearwardly from the rear wheel 02, and the horizontal cross section of the luggage box 01 has a U-shape. Accordingly, the luggage box 01 extends an excessive distance rearwardly from the rear of the vehicle body, thus enlarging the total size of the motorcycle. Also, the upper half section 01a of the luggage box 01 is vertically openably supported at the rear end of the lower half section 01b in such a manner as to be pivotably openable at right angles. Accordingly, the weight of the upper half section 01a of the luggage box 01 is borne at the rear end of a vehicle body frame, thus necessitating great stiffness in the vehicle body frame causing an increase in weight of the vehicle body. Further, the provision of the luggage box 01 causes an increase in the number of component parts and complicates the assembly operation.

Yet another problem of motorcycles of the described type addressed by an aspect of the present invention is that the container casings forming the luggage box or side trunks oftentimes cannot be made sufficiently large to accommodate large sized objects, such as a or a helmet or the like, because of air resistance considerations. Although this problem of storage space can be alleviated by simply enlarging the width of the container case, this solution compounds the air resistance problem.

Still further, the present invention addresses the problem of protecting the luggage box that may extend laterally from the vehicle body a distance greater than the steps provided to support the feet of the operator and rider. In these motorcycles, a pair of steps are typically provided at substantially the central portion of the vehicle body to extend sidewardly of the same, and a side trunk is located longitudinally behind the steps in such a manner as to extend sidewardly of the vehicle body. When the vehicle body is moved in a direction tending to cause it to contact the road surface, or the like, the side trunk that extends sidewardly an amount greater than the steps is brought into contact with the road surface. As the side trunk is designed to have sufficient strength or stiffness only for merely accommodating luggage, or the like, it tends to be damaged. To avoid this problem according to the prior art, an independent protection stay is fixed to the vehicle body. As a result of this practice, however, the weight of the vehicle body is undesirably increased because of the protection stay. Furthermore, if the protection stay projects from a cowl, the exterior shape of the cowl cannot be made continuous.

It is to the amelioration of these problems, therefore, to which the present invention is directed.

SUMMARY OF THE INVENTION

According to the present invention, there is provided a motorcycle comprising a seat cowl divided into an upper cowl section to which grab rails may be fixedly attached adjacent the seat and a lower cowl section; a luggage box having a pair of side luggage spaces separate from each other on opposite sides of a rear wheel; and a pivotal shaft provided on a front side of the luggage box, wherein the lower cowl section is integrally formed with the luggage box and is mounted to a vehicle body, and the upper cowl section is integrally connected to a rear seat and is vertically openably supported to the pivotal shaft.

As mentioned above, the seat cowl is divided into upper and lower cowl sections. The luggage box has a pair of luggage spaces separate from each other on opposite sides of the rear wheel of the motorcycle. The lower section of the seat cowl is integrally formed with the luggage box, and is mounted to the vehicle body. With this construction, the luggage box does not extend rearwardly from a rear end of the rear wheel. Consequently, while the luggage spaces can be made large, the vehicle body need not be made unduly large.

Furthermore, as the upper cowl section is integrally connected to the rear seat, and is vertically openably supported to the pivotal shaft located on the front side of the luggage box, the weight of the upper cowl section and the rear seat is not borne at the rear end of the vehicle body frame but is borne near a longitudinally central position of the vehicle body frame. Therefore, it is not necessary to increase the stiffness of the vehicle body frame as compared with the prior art, thereby reducing the total weight of the vehicle body.

With the above construction also, luggage can be accommodated in the luggage box integrally formed with the lower cowl section. The grab rail fixed to the upper cowl section can also be used as a grip for opening and closing the upper cowl section about the pivotal shaft located on the front side of the luggage box.

According to a second aspect of the invention, a supporting frame may be connected to the vehicle body frame for supporting the underside of the luggage box, wherein the lower cowl section is integrally formed with the luggage box and is mounted to the vehicle body. This organization also provides that the upper cowl section be integrally connected to the rear seat forming a cover for the luggage box having an upper opening and a bottom surface formed as a rear fender.

In this second aspect of the present invention the luggage box is formed as an integral box having an upper opening, and its underside is supported by a supporting frame connected to the vehicle body frame. Further, since the lower surface of the luggage box is also utilized as a rear fender, it is not necessary to mount an independent rear fender, thus reducing the number of parts. The rear fender formed by the lower surface of the luggage box serves to prevent the water from entering the luggage box from its side and lower surfaces.

According to a third aspect of the invention the lower cowl section integrally formed with the luggage box is mounted to a supporting frame with mounting parts, and the supporting frame is integrally mounted to the vehicle body frame. In assembling the vehicle body, therefore, the lower cowl section and the mounting parts are preliminarily mounted to the supporting frame, and the supporting frame is then mounted to the vehicle body frame. Thus, the assembling operation can be made more efficient.

According to another aspect of the invention, there is provided a motorcycle comprising a step extending sidewardly of the vehicle body, an extended portion, such as a luggage box extending sidewardly of the vehicle body to a degree greater than the step, a bumper formed as part of the frame of the vehicle body for reinforcing the extended portion, and a protector covering the bumper. By means of this construction, if the vehicle body comes into contact with a road surface, for example, a large external force, such as the weight of the vehicle body and the shock from the road surface, is borne through the protector by the bumper that is formed as a part of the vehicle body frame. Accordingly, a large external force is not applied to the extended portion, such as a cowl forming the side trunk, thereby preventing the extended portion from being damaged. Furthermore, as the bumper is covered with the protector, the protector may be formed as a part of the cowl, thereby improving the external appearance of the motorcycle and making a continuous outer shape of the cowl. Also, the extended portion is located behind the step, and an outer surface of the expanded portion continuously extends rearwardly from a position of the step to form a streamline shape. Therefore, feet and legs of an operator positioned on the steps can be held in contact with the streamlined outer surface of the expanded portion. Also, the protector is formed independently of the outer panel constituting the extended portion, and the outer panel is fixed to a portion of the vehicle body frame other than the bumper. Therefore, where the vehicle body is brought into contact with the road surface with such a force as to cause damage, the protector alone may have to be replaced to, thereby, easily repair the vehicle body.

Further, the described motorcycle further comprises a first cowl for covering a front portion of the vehicle body, a second cowl for covering a rear portion of the vehicle body, and a third cowl for covering a portion near the step, wherein the first, second and third cowls are designed to be mounted flush with each other, and the third cowl extends integrally from the portion near the step to an offset portion to be connected to the extended portion, and is connected at its opposite ends to the first and second cowls without being connected to the vehicle body.

It is an another object of the present invention to provide a luggage box which is low in air resistance and which is capable, if necessary, of containing large sized goods such as a helmet, or the like. To accomplish this, the present invention provides a luggage box for the motorcycle that is adapted to be attached on side members of the vehicle body and that comprises an outer case and an inner case in which the outer case is attached to the inner case in such a way as to be capable of sliding laterally inwardly and outwardly with respect to the inner case. Consequently, according to this aspect of the invention, since the luggage box is composed of the inner case and the outer case and the latter is adapted to be capable of sliding laterally inwardly and outwardly with respect to the inner case, the width of the luggage box can be made small by sliding the outer case toward the inside of the vehicle body, whereby it can operate to reduce air resistance. Alternatively, as the occasion demands, the width of the container case can be made large by sliding the outer case outwardly of the vehicle body, whereby the luggage box is capable of containing large sized goods, such as a helmet or the like.

For a better understanding of the invention, its operating advantages and the specific objectives obtained by its use, reference should be made to the accompanying drawings and description which relate to a preferred embodiment thereof.

DETAILED DESCRIPTION OF THE INVENTION

Figure 1:
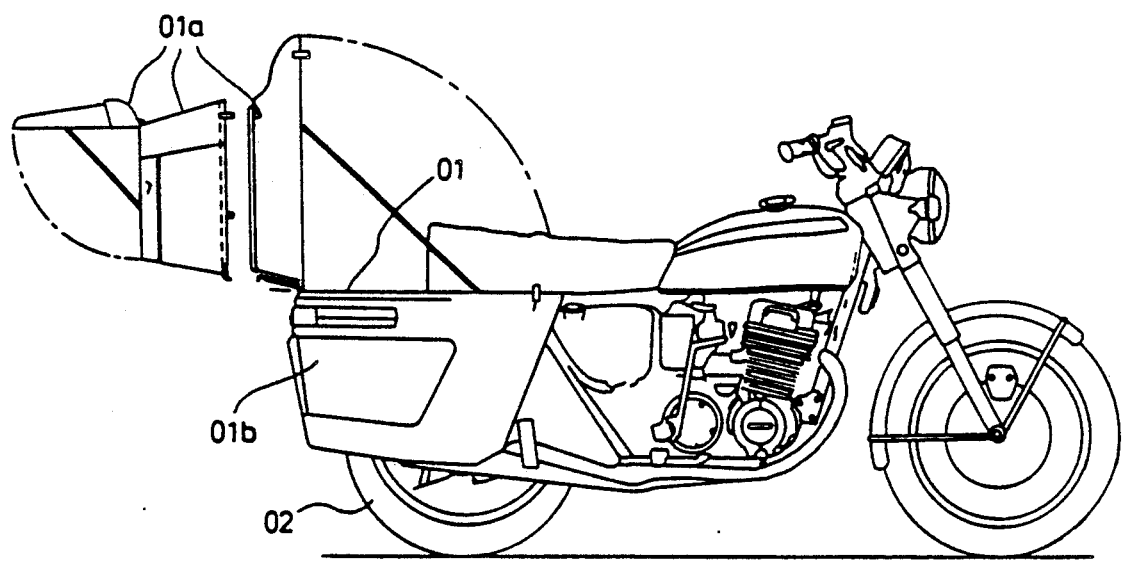
FIG. 1 is a side elevational view of a motorcycle according to the prior art.

With particular reference to FIGS. 1 to 10 there is shown a vehicle body frame 1 that includes a head pipe 2, a rectangular pipe-like main frame 3 integrally fixed at its front end to an upper portion of the head pipe 2, a down tube 4 integrally fixed at its upper end to a lower portion of the head pipe 2 and integrally connected at its lower end through a bottom plate 5 to a rear end of the main frame 3, a connecting member 6 for integrally connecting the main frame 3 with the down tube 4 at their respective intermediate positions, a seat rail 7 extending rearwardly from the intermediate position of the main frame 3, and a back stay 8 for integrally connecting a rear portion of the seat rail 7 with the bottom plate 5.

A rear fork 9 is vertically swingably pivoted at its front end to the bottom plate 5, and a rear cushion 10 is interposed between the rear portion of the seat rail 7 and the rear fork 9. A rear wheel 11 is rotatably mounted to a pair of rear ends of the rear fork 9. The rear wheel 11 is driven by an engine (not shown) carried by the vehicle body frame 1 to thereby enable the motorcycle to run.

A front upper cowl 12 and a front lower cowl 13 are mounted to the front portion of the vehicle body frame 1. A rear upper cowl 14 is located behind the front upper cowl 12, and a rear lower cowl 1 is located behind the front lower cowl 13. The rear upper cowl 14 and the rear lower cowl 15 are also mounted to the vehicle body frame 1. A cover 16 is located above the front upper cowl 12 and the rear upper cowl 14. The cover 16 is provided with an openable lid 16a.

A seat 17 is fixed on the upper side of the rear portion of the rear upper cowl 14, and a fuel tank 18 is located beneath the seat 17 with its access opening disposed below the lid 16a of the cover 16, so that fuel may be supplied into the fuel tank 18 by upwardly opening the lid 16a. A seat cowl 19 is located behind the seat 17 and the rear upper cowl 14. The seat cowl 19 is constructed of an upper cowl section 20 and a lower cowl section 21 separate from each other. The upper cowl section 20 of the seat cowl 19 constitutes a lid portion 23 of a luggage box 22 and carries a bottom plate 30 for mounting a rear seat 29. The lid portion 23 and the bottom plate 30 are integrally mounted to a swing frame 31 having a pivot 31a. The swing frame 31 is vertically swingably pivoted at opposite sides of its front end to oppositely spaced portions of the seat rail 7. A damper (gas cylinder) 32 is interposed between the seat rail 7 and the swing frame 31 so that, when the swing frame 31 is swung upwardly, the weight of the lid portion 23 and rear seat 29 may be resiliently supported by the damper 32.

A luggage box supporting frame 33 is fixed at its opposite ends to the rear end of the seat rail 7 and to oppositely spaced curved portions of the back stay 8. A box section 24 of the luggage box 22 is formed at its lower portion on opposite sides with a pair of recesses 26 adapted to be loosely engaged with the luggage box supporting frame 33. The box section 24 is secured to the seat rail 7 and the luggage box supporting frame 33.

A rear bumper 44, as a supporting member for an extended portion of the vehicle, is integrally mounted to the luggage box supporting frame 33. A lower cover 34 for covering each recess 26 and the luggage box supporting frame 33 is detachably mounted to the box section 24. A rear protector 45, in the form of a cowl member for covering the rear bumper 44, is detachably mounted to the lower cover 34.

The box section 24 is formed at its upper portion and at the central portion with members forming a rear fender 27. Opposite side portions of the rear fender 27 are upwardly expanded to form rear seat retaining portions 28 against which the swing frame 31 is adapted to abut.

Figures 3, 4:
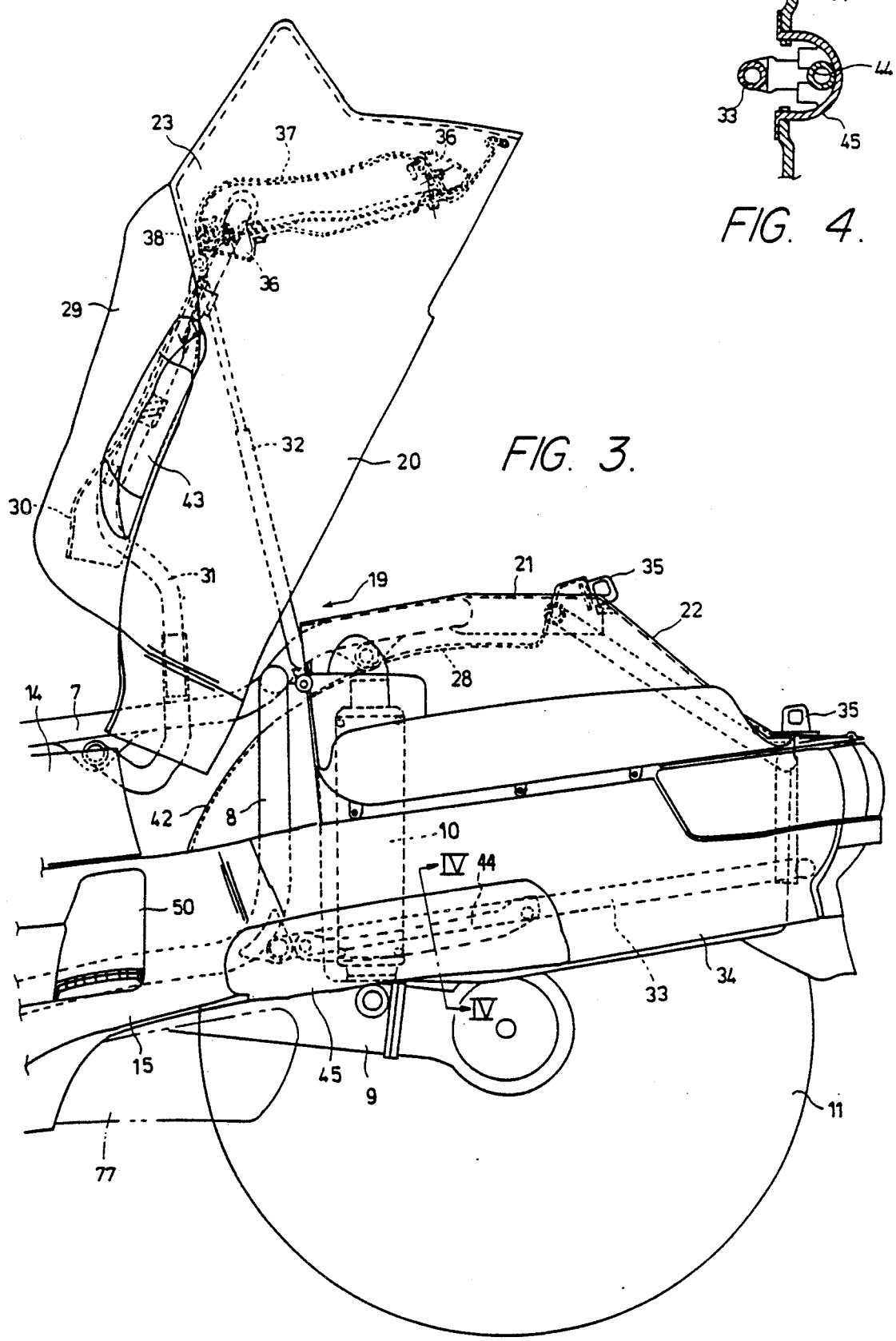
FIG. 3 is an enlarged, partial side elevational view of the rear portion of the motorcycle of FIG. 2 showing the luggage box lid in an open condition.
FIG. 4 is a sectional view taken along line IV—IV of FIG. 3.
Figure 5:
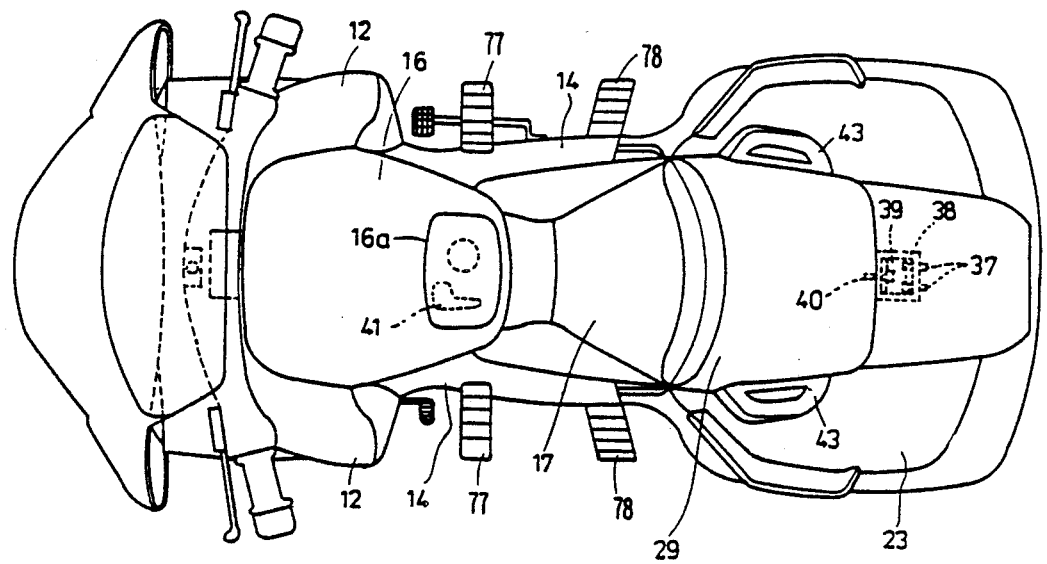
FIG. 5 is a top plan view of the motorcycle of FIG. 2.
Figure 6:
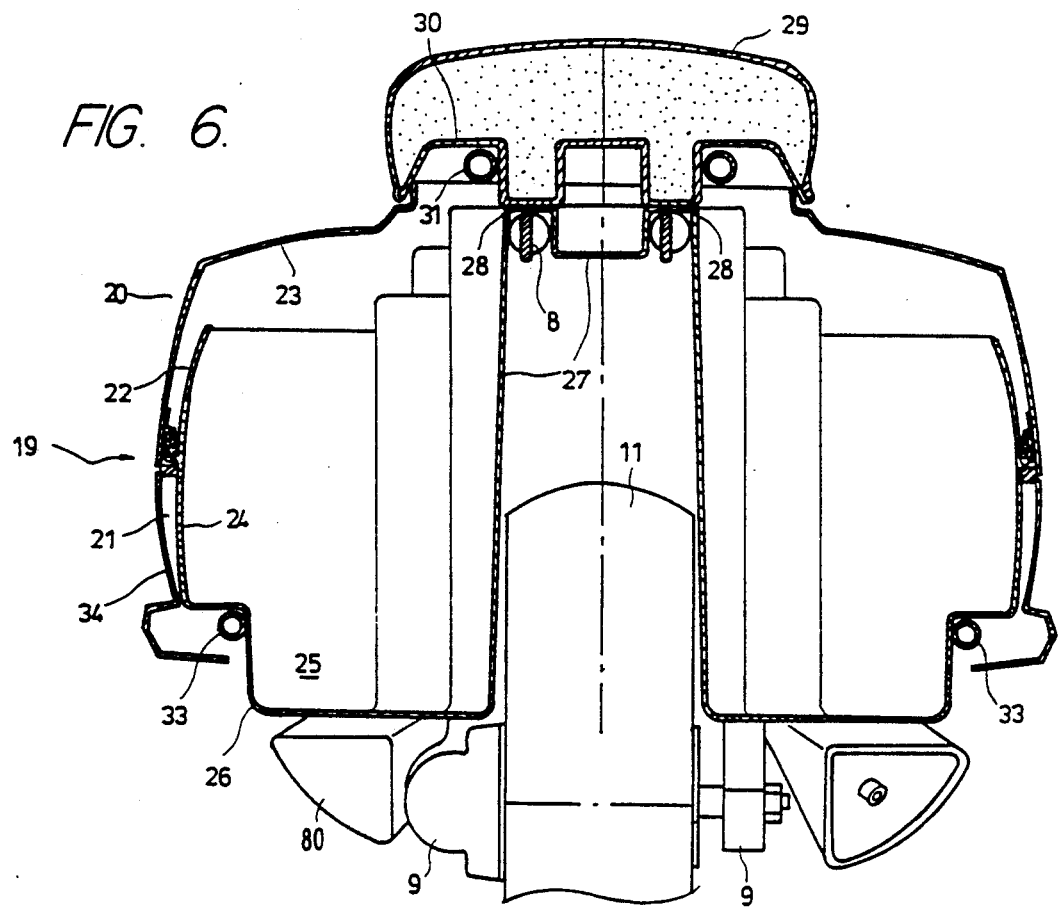
FIG. 6 is a sectional view taken along line VI—VI of FIG. 2.
Figure 7:
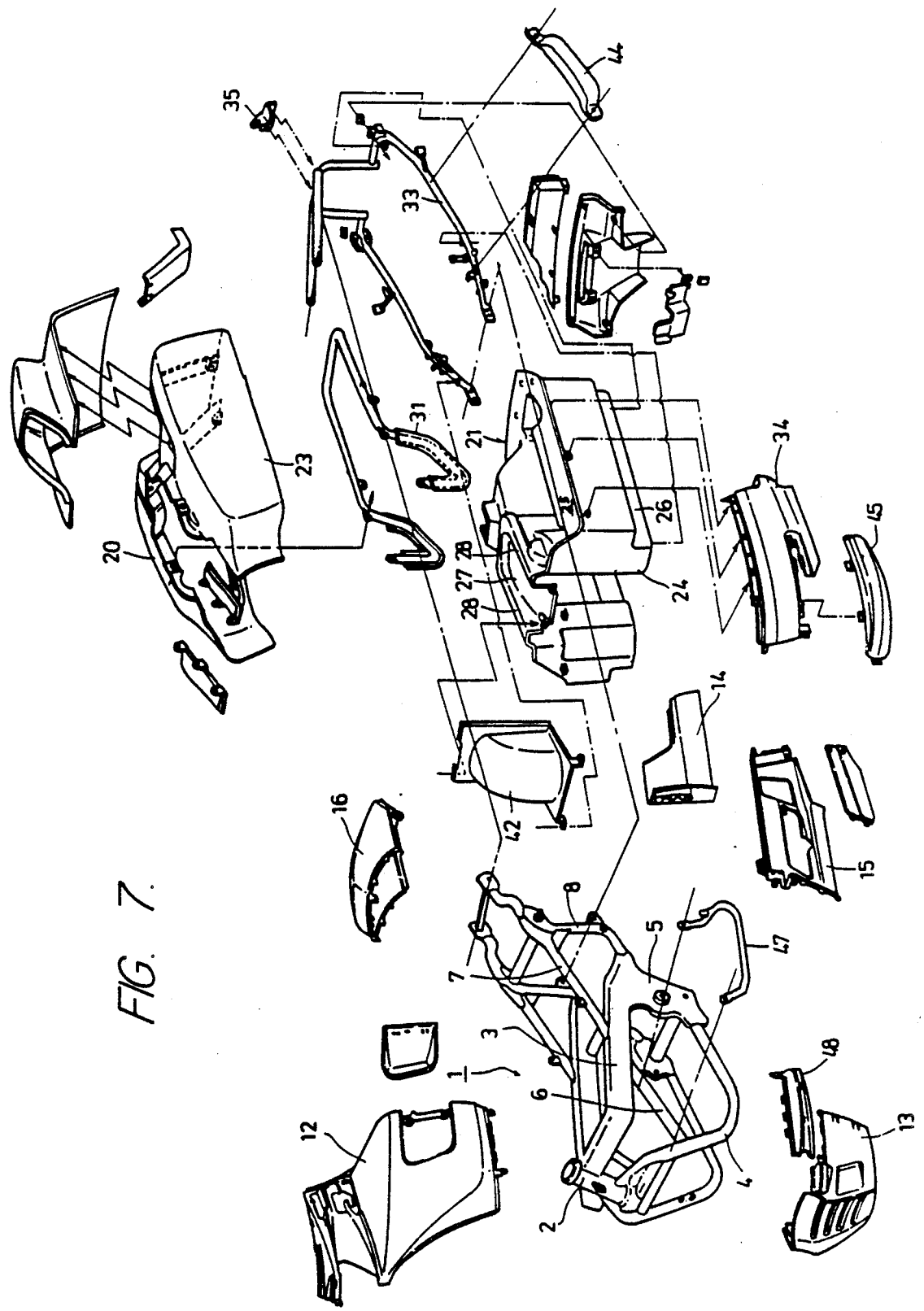
FIG. 7 is an exploded perspective view of the frame and cowling of the motorcycle of FIG. 2.

A pair of upper and lower lock members 35 are integrally mounted to the rear portion of the box section 24, while a pair of lock devices 36 adapted to releasably engage the lock members 35 are integrally mounted to the lid portion 23. A cable 37 is connected at its one end to each of the lock devices 36, and the other end of each cable 37 is connected to a movable member 39 in a junction box 38 formed in the cover 16, as shown in FIGS. 3 and 5. The movable member 39 is also connected to a rear end of an operating cable 40. The operating cable 40 is connected at its front end to an operating lever 41 located below the lid 16a provided in the cover 16 so that, when the operating lever 41 is operated, both lock devices 36 may be simultaneously released from the lock members 35.

Figure 8:
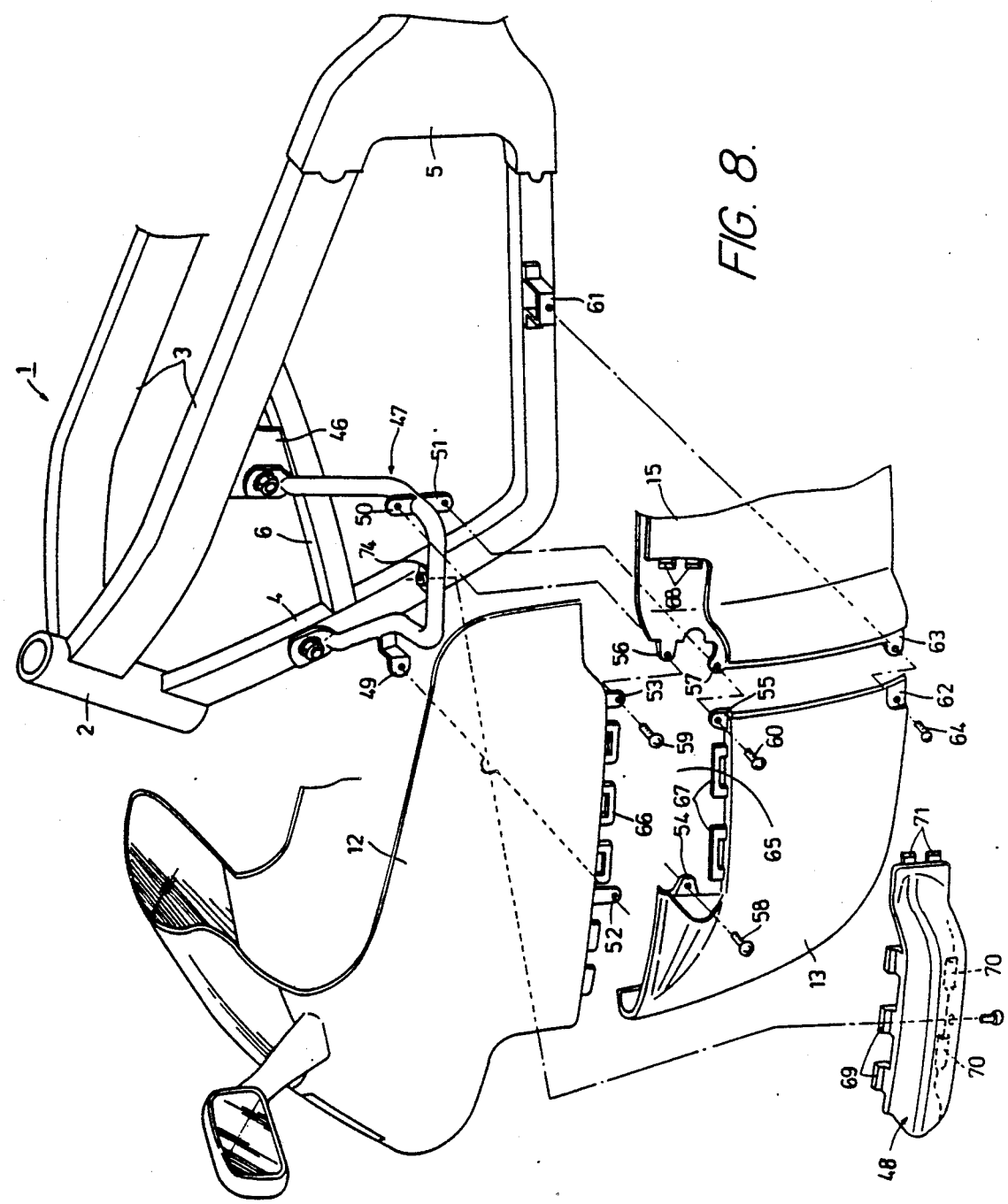
FIG. 8 is an enlarged exploded perspective view of a front portion of a motorcycle of FIG. 2.

Referring to FIG. 8, a connecting portion between the main frame 3 and the connecting member 6 is reinforced by a reinforcing plate 46. A front bumper 47 is fixedly mounted at its opposite ends to the down tube 4 and the reinforcing plate 46. The front bumper 47 is integrally formed with a front bracket 49 projecting forwardly and a pair of rear brackets 50 and 51 projecting vertically in opposite directions.

The front upper cowl 12 is integrally formed at its lower edge with a pair of mounting tabs 52 and 53, and the front lower cowl 13 is integrally formed at its upper edge with a pair of mounting tabs 54 and 55. Further, the rear lower cowl 15 is integrally formed at its front edge with a pair of mounting tabs 56 and 57. A screw 58 is inserted through the mounting tab 52 of the front upper cowl 12 and the mounting tab 54 of the front lower cowl 13, and is threadedly engaged with the front bracket 49. A screw 59 is inserted through the mounting tab 53 of the front upper cowl 12 and the mounting tab 56 of the rear lower cowl 15, and is threadedly engaged with the rear bracket 50. A screw 60 is inserted through the mounting tab 55 of the front cowl 13 and the mounting tab 57 of the rear lower cowl 15, and is threadedly engaged with the rear bracket 51. Thus, the front upper cowl 12, the front lower cowl 13 and the rear lower cowl 15 are fixedly mounted through the front bumper 47 to the vehicle body frame 1.

The down tube 4 is formed at its rear portion with a bracket 61. The front lower cowl 13 is formed at its rear lower corner with a mounting portion 62, and the rear lower cowl 15 is integrally formed at its front lower edge with a mounting tab 63. A screw 64 is inserted through the mounting portion 62 of the front lower cowl 13 and the mounting tab 63 of the rear lower cowl 15, and is threadedly engaged with the bracket 61. Thus, the front lower cowl 13 and the rear lower cowl 15 are fixedly connected with each other at their lower portions.

A rectangular opening 65 is so defined as to be surrounded by the mounting tabs 52 and 53 of the front upper cowl 12, the mounting tabs 54 and 55 of the front lower cowl 13, and the mounting tabs 56 and 57 of the rear lower cowl 15. A front protector 48 is detachably mounted in such a manner as to close the opening 64 and cover the front bumper 47. That is, the front upper cowl 12 is formed at its lower edge with female slotted tabs 66, and the front lower cowl 13 is formed at its upper edge with female slotted tabs 67. Further, the rear lower cowl 15 is formed at its front upper edge with slots 68. On the other hand, the front protector 48 is formed at its outer periphery with male tabs 69, 70 and 71 adapted to be detachably engaged with the female slotted tabs 66, 67 and slots 68 in a mating fashion.

Figure 9:
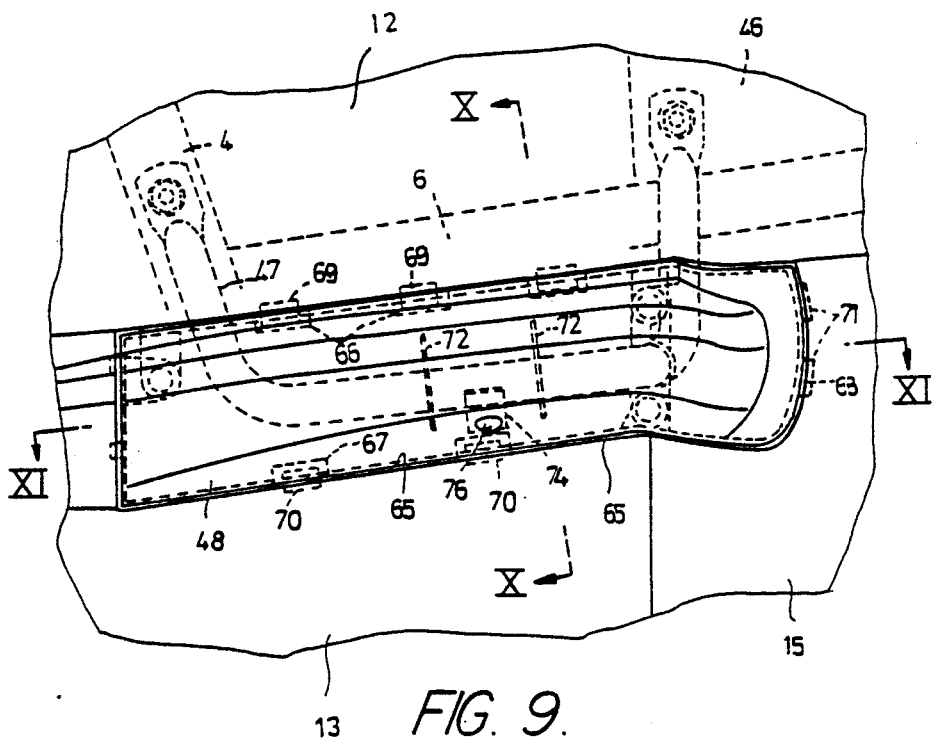
FIG. 9 is a side elevational view of the bumper organization of the motorcycle of FIG. 2.
Figure 10:
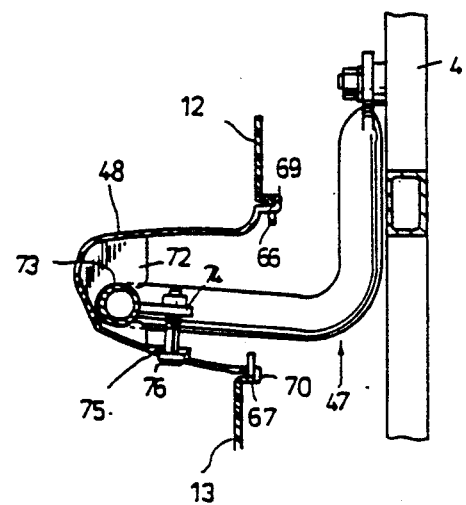
FIG. 10 is a sectional view taken along line X—X of FIG. 9.
Figure 11:
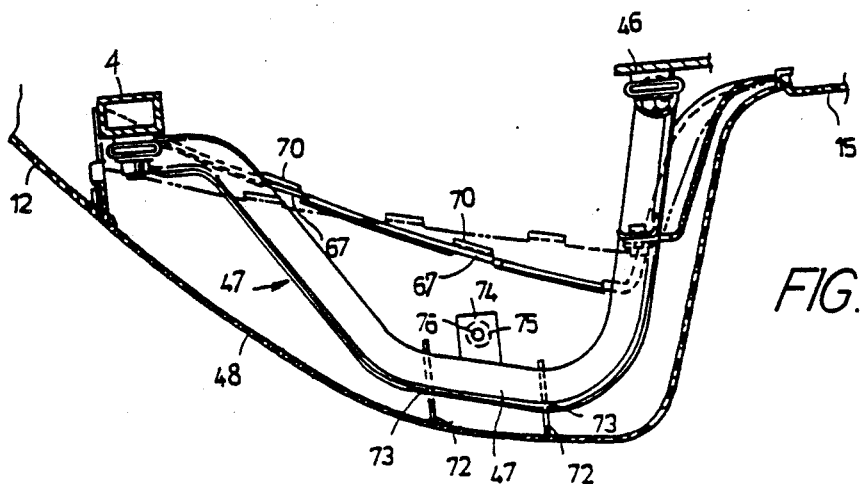
FIG. 11 is a sectional view taken along line XI—XI of FIG. 9.
Figure 12:
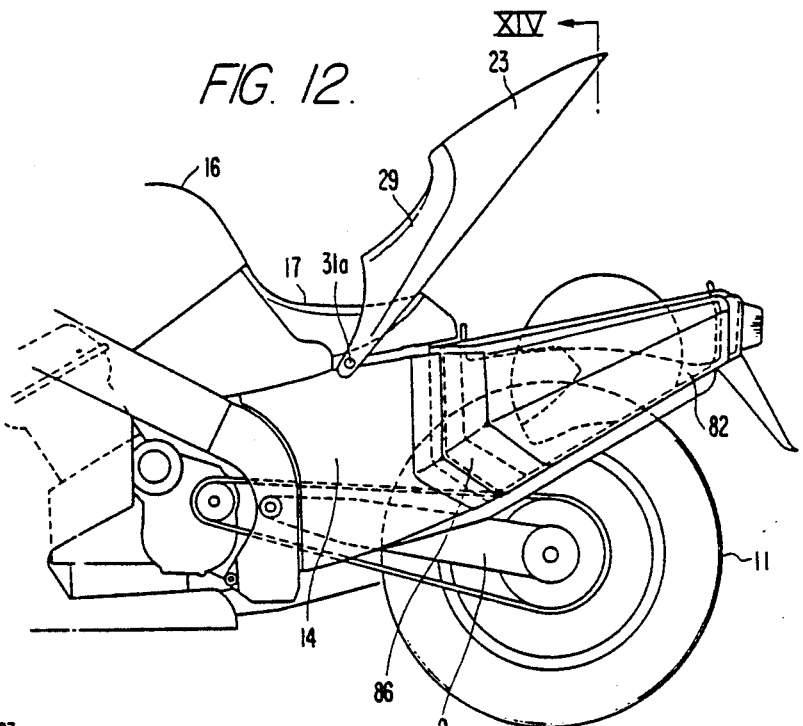
FIG. 12 is a partial elevational view of the rear portion of a motorcycle according to another embodiment of the invention.

Referring to FIGS. 9 to 11, the front protector 48 is formed at its inner surface with a pair of front and rear ribs 72 projecting in a transverse direction of the vehicle body. Each of the ribs 72 is formed with a cutout recess 73 adapted to detachably receive the front bumper 47.

The front bumper 47 is integrally formed at its longitudinally central position with a bracket 74 projecting in the transverse direction of the vehicle body, and the front protector 48 is formed at its lower central position with a through-hole 75. A screw 76 is inserted through the through-hole 75, and is threadedly engaged with the bracket 74 of the front bumper 47. Thus, the front protector 48 is disengageably secured to the assembly formed by the front upper cowl 12, the front lower cowl 13, the rear lower cowl 15 and the front bumper 47.

The front protector 48 is formed of a synthetic resin such as polypropylene having a shock absorptivity and an elasticity greater than the front upper cowl 12, the front lower cowl 13 and the rear lower cowl 15, so that the front protector 48 may be elastically deformed upon receipt of shock forces and thereby is capable of resisting damage by breaking.

Figure 2:
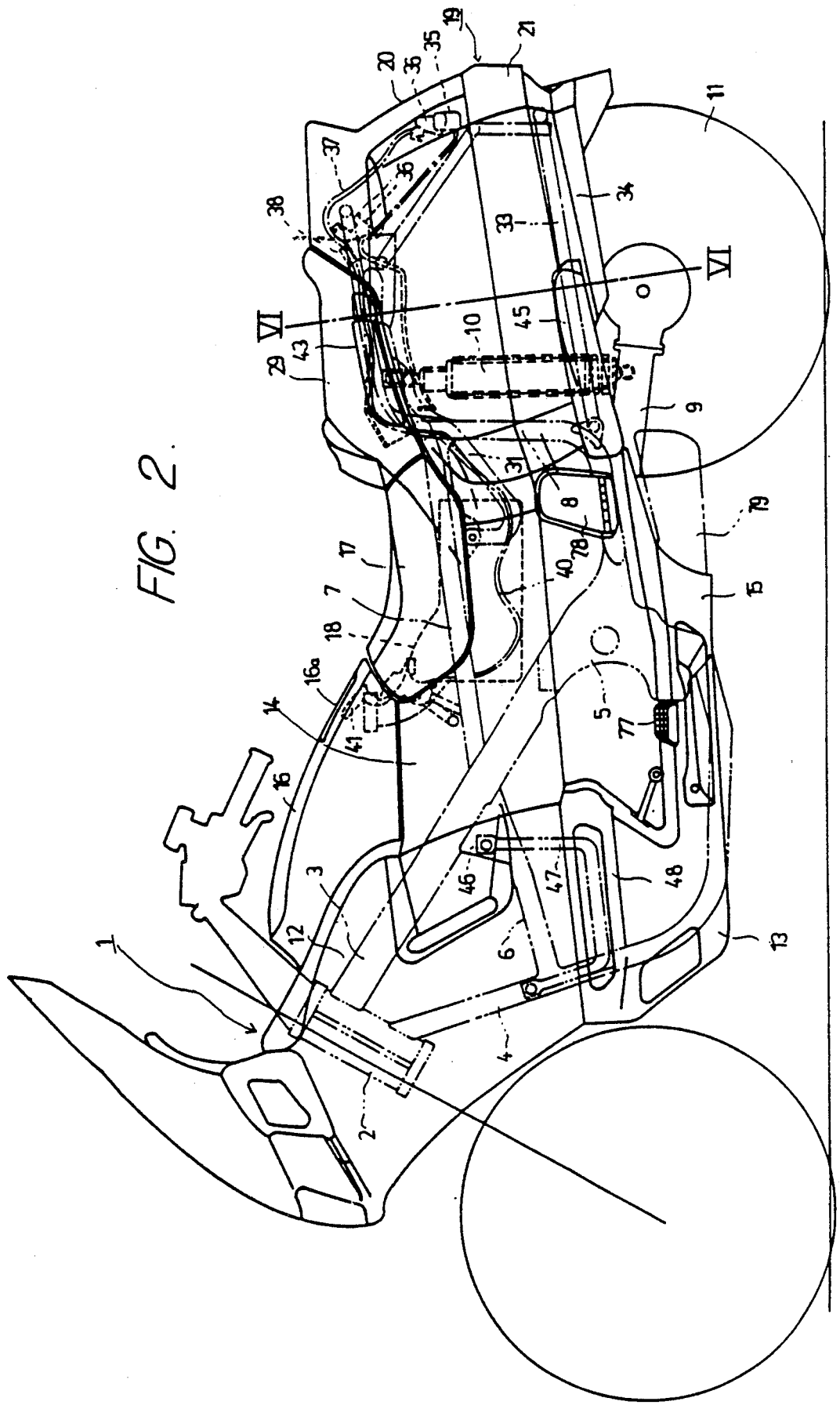
FIG. 2 is a side elevational view of a motorcycle according to a preferred embodiment of the invention.

As shown in FIG. 2 and 5, a pair of right and left steps 77 are provided to project sidewardly from the front lower cowl 13, and a pair of right and left steps are provided at a position behind and above the steps 77 to project sidewardly from the rear lower cowl 15. Further, a dummy muffler 79 is provided at a lower portion of the rear lower cowl 15 to extend rearwardly therefrom.

In operation, when the operating lever 41 is lifted, the lock devices 36 are unlocked through the operating cable 40, the junction box 38 and the cables 37, and are released from the lock members 35. As a result, the upper cowl section 20 of the seat cowl 19 and the lid portion 23 of the luggage box 22 are forcibly upwardly opened by the spring force of the damper 32, thus allowing luggage to be put into and removed from the pair of right and left luggage spaces 25 defined in the luggage box 22. Conversely, when the upper cowl section 20 and the lid portion 23 are open and are pressed down against the spring force of the damper 32, the luggage spaces 25 are enclosed by the lid portion 23, and the lock devices 36 are brought into locking engagement with the lock members 35.

The luggage spaces 25 of the luggage box 22 are defined on the opposite sides of the rear wheel 11, and do not extend beyond the rear end of the rear wheel 11. Consequently, the overall storage capacity of the vehicle is increased without a concomitant increase in the length of the vehicle body. That is, enlargement of the motorcycle is avoided.

Further, when the spring frame 31 is swung upwardly, the weight of the upper cowl section 20 and the lid portion 23 is borne by the front pivoting portion of the swing frame 31 and the damper 32 connected to the swing frame 31. That is, the weight is not borne by the rear end portion of the seat rail 7 constituting a rear member of the vehicle body frame 1. Therefore, it is not necessary to thicken the vehicle body frame 1, especially the seat rail 7, to accommodate the lid portion 23, thus reducing the weight of the vehicle body.

Even when open the upper cowl section 20 and the lid portion 23 are positioned above the luggage spaces 25 so as to cover the same, thereby protecting the luggage spaces and their contents from rain and other adverse elements.

Additionally, as the grab rails 43 are integrally mounted on the opposite sides of the upper cowl section 20, they contribute, not only to the easy opening and closing operation of the upper cowl section 20 and the lid portion 23, but also to easy handling of the motorcycle by permitting gripping the grab rails 43.

In the case that the motorcycle is caused to contact by impact a road surface, the front protector 48 for the front bumper 47 and the rear protector 45 for the rear bumper 44 are brought into first contact with the road surface. Therefore, the front upper cowl 12, the front lower cowl 13, the rear upper cowl 14 and the rear lower cowl 15 are prevented them from contacting the road surface and thereby prevented from being damaged or broken.

Furthermore, as the rear protector 45 and the front protector 48 are closely fitted with the rear bumper 44 and the front bumper 47, respectively, the weight of the vehicle body and the shock from the road surface applied to the rear protector 45 and the front protector 48 are directly transmitted to the rear bumper 44 and the front bumper 47. Therefore, no undue local force is applied to the rear protector 45 and the front protector 48. Additionally, since the rear protector 45 and the front protector 48 are formed of synthetic resin having a large shock absorptivity and elasticity, they can well resist damage or breaking.

Further, as the rear bumper 44 and the front bumper 47 are fully covered with the rear protector 45 and the front protector 48, the external appearance of the vehicle body is improved, and running resistance is reduced. In the event the rear protector 45 and the front protector 48 are damaged or broken, however, they can be easily removed for replacement. Also, as described above, the protector may be formed as a part of the cowl, thereby improving the external appearance of the motorcycle and making the outer shape of the cowl continuous.

Further, the feet and legs of an operator that are positioned on the step can be held in contact with the streamlined outer surface of the extended portion continuously extending rearwardly from a position of the step, thus ensuring a secure hold.

Also, as the protector is formed independently of an outer panel constituting the extended portion, the protector can be easily replaced should the vehicle body come into contact with the road surface to an extent to cause damage to the protector. Therefore, the vehicle body can be easily repaired at low cost.

Additionally, even when there is dimensional error at the connecting portions among the front cowl, the intermediate cowl and the rear cowl, or there is an error in mounting the front and rear cowls to the vehicle body frame, these errors can be absorbed by the elastic deformation of the cowls, thus ensuring the connection among the cowls and improving the external appearance with less gaps among the cowls at their connecting portions.

In the embodiment of the invention, shown in FIGS. 12 to 15, wherein identical numerals to reference those members that are identical to the members illustrated in the embodiment of FIGS. 2 to 11, means are provided for adjusting the luggage carrying capacity of the luggage box.

According to this embodiment of the invention, a luggage box 82 is provided at the rear of the rear upper cowl 14 on both sides of the vehicle body. The luggage box 82 comprises an inner case 86 and an outer case 88. The inner case 86 comprises a central portion 86a formed in an inverted U-shape to accommodate the rear wheel 11, horizontal portions 86b, 86b extending in a horizontal direction from the lower edges of the central portion 86a, a front wall 86c, and a rear wall 86d. In the present embodiment, the inner case of both the left and right luggage boxes 82 is formed integrally as one member, which member may be formed from synthetic resin.

The outer case 88 is capable of sliding with respect to the inner case 86 and, accordingly, has in each of flange portions 88a formed at the inwardly extending surfaces of the left and right outer cases 88 two elongated slots 88b, 88b that are arranged to extend obliquely rearwardly. The horizontal portions 86b, 86b of the inner cases 86, and the flange portions 88a, 88a are mutually fixed by means of bolts 90, 90 that extend through the elongated slots 88b, 88b.

Figure 14:
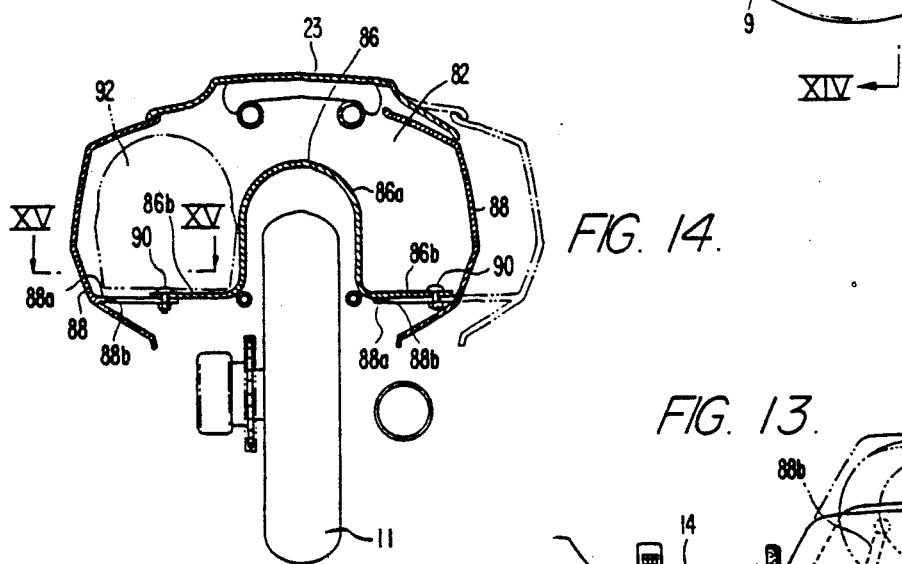
FIG. 14 is a sectional elevational view taken along line XIV—XIV of FIG. 12.
Figure 13:
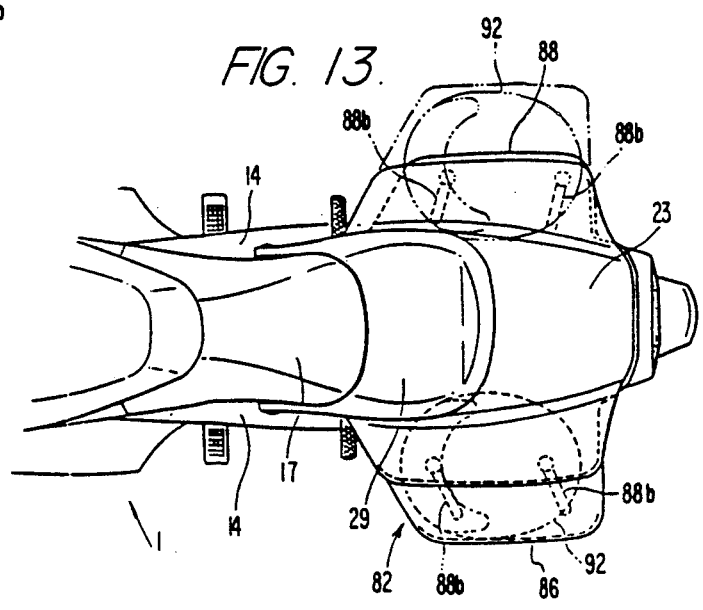
FIG. 13 is a partial plan view of the rear portion of the motorcycle of FIG. 12.
Figure 15:
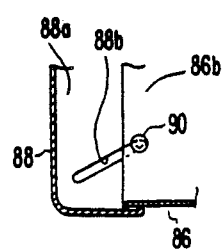
FIG. 15 is a sectional view taken alone line XV—XV of FIG. 14.

Also, the inner cases 86 are formed with forwardly facing walls 86c that project obliquely rearwardly. The front wall 88c of the outer case 88 is similarly obliquely formed so that, as the respective outer cases 88 are slidingly moved with respect to the inner cases 86 the walls 86c and 88c remain substantially coplanar such that air resistance is reduced as the outer case 88 is extended. Furthermore, as shown in FIG. 14, the outer case 88 can be slightly vertically inclined so that its side wall extends substantially along the side surface of a helmet 92.

In the described embodiment, the outer case 88 can be slid a selected amount to fix it at the desired size of luggage box 82 whereby the luggage box 82 is capable of being made to assume a size, as required, without disrupting its outline and air resistance characteristics. Conversely, when the luggage box 82 is extended with the outer case 86 moved outwardly, as the occasion demands, as for example, for parking or the like, the luggage box 82 is capable of having its enlarged width reduced by simply sliding the outer cases 86 inwardly.

By means of this embodiment of the invention, therefore, it is possible to readily contain large sized goods, such as a helmet 92 or the like in the luggage box. Also, since the front wall portions of the inner case and outer case are rearwardly, substantially coplanarly inclined and because the side wall of the outer case 88 is formed by having an inclination along the outline of the helmet 92, the ability to reduce air resistance and to improve vehicle shape is increased.

It should be further understood that, although a preferred embodiment of the invention has been illustrated and described herein, changes and modifications can be made in the described arrangement without departing from the scope of the appended claims.

What is claimed is:

1. A motorcycle comprising:
   a frame assembly mounting seat means including a front seat and a rear seat and longitudinally spaced front and rear wheels;
   a luggage box having a pair of side luggage spaces separately spaced from each other on opposite sides of said rear wheel;
   a pivot shaft mounted on said frame assembly forwardly adjacent said luggage box;
   a cowl attached to said frame assembly, a portion of said cowl forming a closure cover for said luggage box and being connected to said pivot shaft for vertically pivotally opening said luggage box, said cowl including a seat cowl divided into an upper cowl section and a lower cowl section, said lower cowl section being integrally formed with said luggage box and attached to said frame, said upper cowl section forming said luggage box closure cover and being integrally connected to said seat means, said upper cowl section mounting at least said rear seat.

2. A motorcycle according to claim 1 including laterally extending grab rails mounted on said upper cowl section adjacent said rear seat.

3. A motorcycle according to claim 1 in which said frame assembly includes a body frame and a supporting frame mounting said luggage box, said supporting frame being detachably connected to said body frame.

4. A motorcycle according to claim 1 in which said seat means includes a rear seat and including a rear seat cowl attached to said frame assembly and mounting said rear seat, said rear seat cowl being divided into an upper cowl section and a lower cowl section, said lower cowl section being covered with the lower exterior portion of said luggage box, and said upper cowl section being formed for smoothly fitting into said lower cowl section to define said closure cover for said luggage box.

5. A motorcycle comprising:
   a frame assembly mounting seat means and longitudinally spaced front and rear wheels;
   a cowl attached to a frame assembly;
   a luggage box having a pair of side luggage spaces separately spaced from each other on opposite sides of said rear wheel;
   a pivot shaft mounted on said frame assembly forwardly adjacent said luggage box;
   a portion of said cowl forming a closure cover for said luggage box and being connected to said pivot shaft for vertically pivotally opening said luggage box; and
   said frame assembly including a body frame and a supporting frame mounting said luggage box, said supporting frame being detachably connected to said body frame, whereby said supporting frame engages an underside of said luggage box and includes mounting parts for attaching said cowl.

6. A motorcycle according to claim 5 in which said cowl includes a seat cowl divided into an upper cowl section and a lower cowl section and said lower cowl section is attached to said supporting frame by said mounting parts.

7. A motorcycle according to claim 5 further including a bumper device comprising:
   an opening in said cowl;
   a bumper element fixed to said frame assembly and extending laterally through said opening;
   a protector projecting laterally outwardly from said cowl and enclosing said bumper element; and
   means for detachably securing said protector with respect to said bumper element.

8. A motorcycle according to claim 7 in which said protector securing means comprises tabs extending from said protector and slots in said cowl adjacent said cowl opening for reception of said tabs.

9. A motorcycle according to claim 8 in which said protector contains ribs extending laterally inwardly therefrom, and recesses formed in said ribs for reception of said bumper element.

10. A motorcycle according to claim 9 including detachable fastening means detachably securing said protector to said bumper element.

11. A motorcycle according to claim 7 in which said side bumper device extends laterally a distance greater than the lateral extent of said luggage box.

12. A motorcycle according to claim 11 including a step extending laterally from said frame assembly on the longitudinally opposite sides of said side bumper device from said luggage box; said bumper device extending rearwardly from said step; and said protector containing a streamlined shape.

13. A motorcycle according to claim 12 in which said cowl includes a first cowl for covering a front portion of said frame assembly, a second cowl for covering a rear portion of said frame assembly, and a third cowl covering a portion of said frame assembly adjacent said step, and said third cowl being disposed intermediate said first and second cowls and being detached from said frame assembly and attached at its opposite sides to said first and second cowls.

14. A motorcycle comprising:
a frame assembly mounting a seat and longitudinally spaced front and rear wheels;
a cowl attached to said frame assembly;
a luggage box having a pair of side luggage spaces separately spaced from each other on opposite sides of said rear wheel, said luggage box including an inner case fixed with respect to said frame assembly, and an outer case adjustably attached to said inner case for varying the luggage-storing capacity of each of said side luggage spaces, said inner case including a fender portion disposed in overlying relation to said rear wheel, and horizontally disposed support flanges extending laterally oppositely from said fender portion, each of said support flanges adjustably attaching an outer case for varying the luggage storing capacity of the associated side luggage space;
a pivot shaft mounted on said frame assembly forwardly adjacent said luggage box; and
a portion of said cowl forming a closure cover for said luggage box and being connected to said pivot shaft for vertically pivotally opening said luggage box.

15. A motorcycle according to claim 14 in which said inner case includes oppositely disposed, rearwardly inclined wall means forming the front walls of said luggage spaces, and each of said outer cases having a front wall containing a rearward inclination corresponding substantially to that of the associated inner case front wall.

16. A motorcycle according to claim 9 including attachment means comprising a releasable connector operably disposed in laterally elongated slots in said inner case and said outer cases, said slots having an angular disposition corresponding substantially to the inclination of said casing front walls.

17. A motorcycle comprising:
a frame assembly mounting seat means and longitudinally spaced front and rear wheels;
a cowl attached to said frame assembly, and a bumper device including:
an opening in said cowl;
a bumper element fixed to said frame assembly and extending laterally through said opening;
a protector projecting laterally outwardly from said cowl and enclosing said bumper element; and
means for detachably securing said protector with respect to said bumper element.

18. A motorcycle according to claim 17 in which said protector securing means comprises tabs extending from said protector and slots in said cowl adjacent said opening for reception of said tabs.

19. A motorcycle according to claim 18 in which said protector contains ribs extending laterally inwardly therefrom, and recesses formed in said ribs for reception of said bumper element.

20. A motorcycle according to claim 19 including detachable fastening means detachably securing said protector to said bumper element.

21. A motorcycle comprising:
a frame assembly mounting seat means and longitudinally spaced front and rear wheels;
a cowl attached to said frame assembly and including a portion extending laterally to an extent greater than the remainder of said cowl;
an opening in said cowl adjacent said extended portion;
a bumper element fixed to said frame assembly and extending laterally through said opening a distance greater than the lateral extent of said extended portion;
a protector projecting laterally outwardly from said cowl and enclosing said bumper element; and
means for detachably securing said protector with respect to said bumper element.

22. A motorcycle according to claim 21 including a step disposed forwardly of said extended portion and extending laterally from said frame assembly, said bumper element being disposed intermediate said step and said extended portion and extending rearwardly therefrom; and said protector containing a streamlined shape.

23. A motorcycle according to claim 22 in which said cowl includes a first cowl for covering a front portion of said frame assembly, a second cowl for covering a rear portion of said frame assembly, and a third cowl covering a portion of said frame assembly adjacent said step, and said third cowl being disposed intermediate said first and second cowls and being detached from said frame assembly and attached at its opposite sides to said first and second cowls.

24. A motorcycle according to claim 23 in which said third cowl connects with said extended portion and is laterally offset in extending between said steps and said extended portion.

25. A motorcycle comprising:
a frame assembly mounting seat means including a rear seat and longitudinally spaced front and rear wheels;
a rear seat cowl attached to said frame assembly and mounting said rear seat;
a luggage box having a pair of side luggage spaces separately spaced from each other on opposite sides of said rear wheel;
a pivot mounted on said frame assembly forwardly adjacent said luggage box;
a pivot frame supporting said rear seat means connected for pivotal movement to said pivot shaft; and
a portion of said rear seat cowl forming a closure cover for said luggage box and being connected to said pivot frame for vertically pivotally opening said luggage box.

26. A motorcycle comprising:
a frame assembly mounting seat means, a luggage box, and longitudinally spaced front and rear wheels, said frame assembly including a luggage box supporting means that extends to the exterior of said luggage box;
a cowl attached to said frame assembly, and a bumper device including:
an opening in said cowl;
a bumper element fixed to said frame assembly and extending laterally through said opening;
a protector projecting laterally outwardly from said cowl and enclosing said bumper element; and
means for detachably securing said protector with respect to said bumper element.

* * * * *

UNITED STATES PATENT AND TRADEMARK OFFICE
CERTIFICATE OF CORRECTION

PATENT NO. : 5,107,949
DATED : April 28, 1992
INVENTOR(S) : GOTOH et al.

It is certified that error appears in the above-identified patent and that said Letters Patent is hereby corrected as shown below:

claim 16 (column 11, line 35) delete "9" and insert therefor -- 15 --.

claim 25 (column 12, line 44) delete "means".

claim 25 (column 12, line 45) delete "shaft".

Signed and Sealed this

Twenty-sixth Day of October, 1993

Attest:

BRUCE LEHMAN

Attesting Officer

Commissioner of Patents and Trademarks